UNITED STATES PATENT OFFICE.

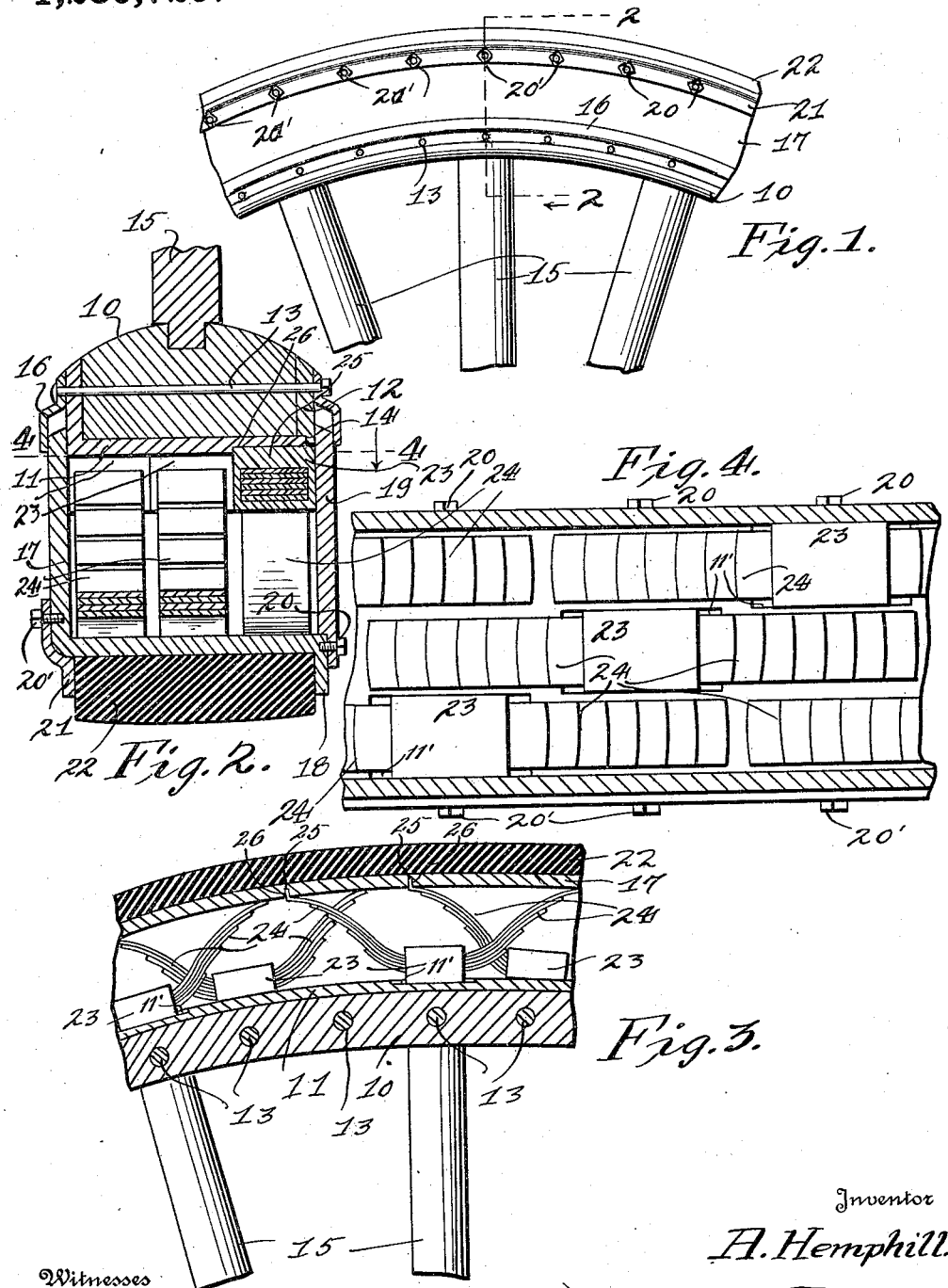

ALWYNN HEMPHILL, OF SAN ANGELO, TEXAS.

AUTOMOBILE-TIRE.

1,280,729.  Specification of Letters Patent.  Patented Oct. 8, 1918.

Application filed September 30, 1915, Serial No. 53,316.  Renewed September 4, 1918.  Serial No. 252,645.

*To all whom it may concern:*

Be it known that I, ALWYNN HEMPHILL, a citizen of the United States, residing at San Angelo, in the county of Tom Green, State of Texas, have invented certain new and useful Improvements in Automobile-Tires; and I do hereby declare the following to be a full, clear, and exact description of the invention, such as will enable others skilled in the art to which it appertains to make and use the same.

This invention relates to improvements in tires, and particularly to cushion tires for use on automobiles, or other vehicles.

The principal object of the invention is to provide a tire which is simple in construction, and effective in operation.

Another object is to provide a tire which is durable and which possesses all of the desirable qualities of the pneumatic tire and is free of the undesirable puncturable features.

Other objects and advantages will be apparent from the following description when taken in connection with the accompanying drawing.

In the drawing:

Figure 1 is a side elevation of a portion of a wheel equipped with my improved tire;

Fig. 2 is a transverse sectional view on the line 2—2 of Fig. 1;

Fig. 3 is a longitudinal sectional view through the tire and rim; and

Fig. 4 is a horizontal sectional view on the line 4—4 of Fig. 2.

Referring particularly to the accompanying drawing, 10 represents the rim or felly of the wheel. Embracing the rim from one side and the tread face is a ring 11 which is L-shaped in cross section. A flat ring 12 is placed against the other side face of the rim, and a plurality of bolts passed through the rings and rim, as clearly shown at 13. The outer, or peripheral edge of the ring 12 is formed with a rabbet 14 which receives the edge of the transverse portion of the other ring. Spokes 15 are suitably secured in the inner face of the rim.

Secured to the outer faces of the rings 11 and 12, by means of the bolts 13, are the offset rings 16. Between one of these rings and the ring 11 is disposed the inner marginal edge of an L-shaped ring 17. This ring is formed on the outer edge of its transverse portion with a circumferentially extending flange 18 against which is secured the outer edge of a flat ring 19 by the bolts 20. A second ring 21 is secured to the other side of the ring 17 by the bolts 20'. This ring 21 extends into parallel relation with the flange 18, to retain a cushion tread ring or band 22 which is disposed on the transverse portion of the ring 17.

Engaged in recesses 11' in the outer face of the transverse portion of the ring 11, and in staggered series are a plurality of blocks 23, each of which carries a laminated bow spring 24. The free end of one of the arms of these springs bears against the inner face of the transverse portion of the ring 17, and in sliding contact therewith while the end of the other arm is formed with a lug 25 which engages in a recess 26 in the ring 17 to hold the spring against displacement.

The inner edge of the flat ring 19 is slidably disposed between the other ring 16 and the ring 12. Thus, the rings 17 and 19 together with the cushion tread move as a single body vertically with respect to the wheel, and against the springs.

What is claimed is:

In a resilient tire for a vehicle wheel, the combination with a felly, of an inner rim mounted on the felly and formed with a plurality of transversely extending series of elongated and longitudinally extending recesses, blocks loosely slidable in the recesses, an outer rim member disposed around the wheel and bodily movable relative to the inner rim member, and spring members rigidly secured intermediate their ends to the blocks and movable therewith, one end of each of the springs being immovably connected to the outer rim member and the other end frictionally and slidably engaging therewith.

In testimony whereof I affix my signature, in the presence of two witnesses.

ALWYNN HEMPHILL.

Witnesses:
  ALBERT J. BUTTERY,
  RAY POWERS.

Copies of this patent may be obtained for five cents each, by addressing the "Commissioner of Patents, Washington, D. C."